United States Patent [19]

Balfour

[11] Patent Number: 4,907,366
[45] Date of Patent: Mar. 13, 1990

[54] MOSQUITO CONTROL

[76] Inventor: Robert S. Balfour, 133 Defense Hwy., Suite 103, Annapolis, Md. 21401

[21] Appl. No.: 413,284

[22] Filed: Sep. 27, 1989

[51] Int. Cl.$^4$ .................. A01M 1/02; A01M 13/00
[52] U.S. Cl. ................................. 43/132.1; 43/114
[58] Field of Search ............... 43/131, 132.1, 114, 43/127; 435/139

[56] References Cited

U.S. PATENT DOCUMENTS

| | | | |
|---|---|---|---|
| 4,506,473 | 3/1985 | Waters | 43/114 |
| 4,765,090 | 8/1988 | Kuan et al. | 43/127 |
| 4,833,818 | 5/1989 | Berta | 43/132.1 |

Primary Examiner—M. Jordan
Attorney, Agent, or Firm—Sherman Levy

[57] ABSTRACT

A way is provided for controlling mosquitoes within the human being is simulated to attract mosquitoes away from areas of human gatherings, such as backyards and the like. A solution of lactic acid in water is prepared and heated to simulate the body temperature of a human being, and a fan or blower is provided to direct the lactic acid molecules away from the areas of human habitation so that mosquitoes or other pests can be subsequently destroyed by heat, electrocution or the like.

8 Claims, 1 Drawing Sheet

MOSQUITO CONTROL

BACKGROUND OF THE INVENTION

1. Field of the Invention

The present invention generally appertains to improvements in mosquito control, and more particularly to a method and means for simulating a human being so that mosquitoes can be attracted away from areas of human gatherings whereby the mosquitoes or other insects or pests can be subsequently destroyed in any suitable manner.

2. Description Of The Prior Art

Insect and mosquito extermination and control devices have been provided, as have methods of producing lactic acid, as for example as shown in prior U.S. Pat. Nos. 4,631,857; 4,662,103; 4,698,303; 4,749,652; 4,771,001; and 4,817,329. However, neither these prior patents nor any others known to applicant achieve the results accomplished by the present invention.

OBJECTS AND SUMMARY OF THE PRESENT INVENTION

A primary object of the present invention is to provide a method and means for controlling or exterminating insects such as mosquitoes, and wherein the present invention provides a quick and simple method and apparatus for attracting mosquitoes away from areas of human gatherings such as backyards or the like, whereby the mosquitoes can be easily destroyed by heat, electrocution, or by other means.

Another object of the present invention is to provide a method and apparatus for controlling insects such as mosquitoes wherein heating elements can be used to evaporate a lactic acid solution which may contain dry ice to supply carbon dioxide molecules, and wherein a suitable fan or blower can be used to direct airflow away from inhabited areas, and wherein the insectcontrolling means can be housed in an insect-destroying electrified grid or similar device.

A still further object of the present invention is to provide a method and apparatus for controlling mosquitoes which is based on the concept that mosquitoes have very specific control sites for the reception of molecules of lactic acid so that with the present invention, a solution of lactic acid and water is provided, and wherein the solution is heated to simulate temperatures of the body of a human being.

Still another object of the present invention is to provide a method and means for controlling mosquitoes wherein once the mosquitoes hone in on the path of the lactic acid and/or the lactic acid carbon dioxide spray that has been broadcasted into the environment, the mosquitoes will be drawn towards the source and be easily destroyed by heat, electrocution and the like.

A still further object of the present invention is to provide a method and means for controlling mosquitoes wherein the same is inexpensive to operate and efficient to use.

These and other objects of the present invention will become apparent with reference to the drawings, the description of the preferred embodiment, and the appended claims.

DESCRIPTION OF THE PREFERRED EMBODIMENT

Figure 1:
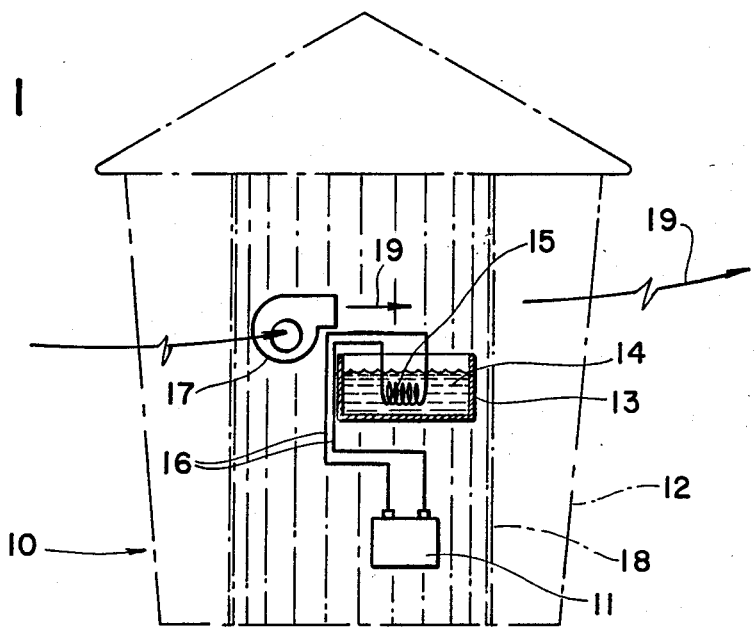
FIG. 1 is a schematic view illustrating one form of the present invention.

Returning in detail to the drawings, and more particularly to FIG. 1, the numeral 10 indicates a mosquito control system or unit that includes a battery 11 or power source that can be arranged in a suitable housing or enclosure 12. Container 13 containing lactic acid solution 14 is adapted to be arranged in housing 12, and a heating element 15 is provided for heating the lactic acid solution 14 to the desired temperature. The heating element 15 is adapted to be electrically connected to the battery or power source 11 by suitable wires or conductors 16.

A fan or blower 17 is provided for directing the lactic acid molecules in a suitable direction such as the direction 19 indicated by the arrow in FIG. 1, and these lactic acid molecules can be moved through a suitable grid-like structure 18. In FIG. 1 the heating element 15 and associated parts are shown located in an elevated position.

Figure 2:
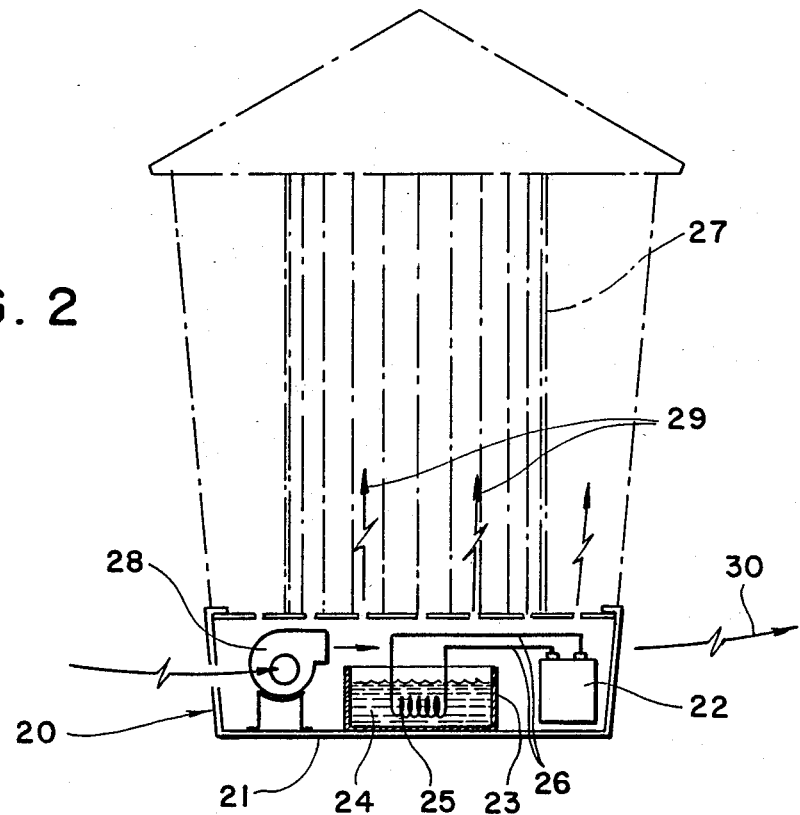
FIG. 2 is a schematic view illustrating another form of the present invention.

Referring to FIG. 2 of the drawings, there is illustrated a modified arrangement of the present invention, wherein the mosquito control unit includes a base 21 that has a battery or source of electrical energy 22 supported therein. The battery 22 is electrically connected to a heating element 25 by means of wires or conductors 26. The heating element 25 is suitably immersed in a lactic acid solution 24 which is arranged in a container 23 that is positioned in the lower portion 21 of the unit 20. The unit 20 may also include a grid-like structure 27. A fan or blower 28 is provided for directing the lactic acid molecules in a suitable direction, as for example as indicated by the numerals 29 and 30.

From the foregoing it will be seen that there has been provided a method and means for controlling insects such as mosquitoes. While the present invention has been specifically described herein in connection with controlling mosquitoes, it is to be understood that the same can be used for controlling other types of insects besides mosquitoes. The present invention can be used for battling or controlling mosquitoes and malaria problems without environmental hazard. Thus the present invention is environmentally safe and is a non-irritant to skin and eyes of humans.

Further, the present invention can be used indoors and outdoors. As previously noted, bugs or insects such as mosquitoes can be directed to a certain area where the bugs or insects can be killed. As is known, certain fumigants and insecticides have been banned, but with the present invention the lactic acid solution is utilized which is not harmful to human beings, and yet the lactic acid solution simulates the body condition of human beings so as to cause mosquitoes to be directed in a direction away from human habitation so that the mosquitoes can be killed.

As shown in the drawings which are for illustrative purposes only, a fan or blower 17 or 28 can be provided. A heating element can be used to evaporate a lactic acid solution which may contain dry ice to supply carbon dioxide molecules, and wherein a suitable fan or blower can be used to direct airflow away from inhabited areas. The insect controlling means can be housed in an insect-destroying electrified grid or similar device. The present invention is thus a bug killer or defense weapon against mosquitoes or other insects.

In conclusion, it can be seen that fans or blowers are used to direct the lactic acid solution away from areas of human activity. The heat elements can be used to evaporate the solution at approximately 98.6 degrees, and the heat elements can be operated on batteries and/or on wall currents and voltage (110 volt AC). A compartment or container is provided to hold the solution of lactic acid molecules and water; and possibly dry ice can be used to supply carbon dioxide molecules. The fan or blower directs the airflow away from inhabited areas. The lactic acid solution can be housed in an insect-destroying electrified grid or similar device. The purpose of the present invention is to simulate a human being and attract mosquitoes away from areas of human gatherings in backyards and the like.

It has been shown that mosquitoes have very specific control sites for the reception of molecules of lactic acid, and the present invention allows for the simulation of a human being by preparing a solution of lactic acid and water which is heated to simulate the body temperature of a human being. A fan is adapted to be placed behind the solution, and the fan can be adjusted to direct the lactic acid molecules away from the area of human habitation. This can also be combined with measured amounts of carbon dioxide molecules that will further simulate a human being. Once the mosquitoes hone in on the path of the lactic acid and/or the lactic acid carbon dioxide spray that has been broadcasted into the invironment, they will be drawn towards the source and can be easily destroyed by heat, electrocution, and the like. The present invention is adapted to be used outdoors against mosquitoes and other pests. The lactic acid can be derived or produced from any suitable source such as from vegetable mass.

I claim:

1. A method of controlling mosquitoes, comprising the steps of heating a lactic acid solution to produce lactic acid molecules, blowing and directing the lactic acid molecules in a direction away from inhabited areas so as to simulate a human being and thereby attracting mosquitoes away from gatherings in backyards and the like.

2. The method as defined in claim 1 and further including using dry ice to supply carbon dioxide molecules.

3. The method as defined in claim 2 and further including an insect destruction zone for killing the mosquitoes.

4. A method of controlling mosquitoes comprising the steps of simulating a human being and utilizing the concept that mosquitoes have very specific control sites for the reception of molecules of lactic acid, comprising the steps of preparing a lactic acid solution consisting of lactic acid in water, heating the lactic acid solution to simulate the body temperature of a human being, blowing the lactic acid molecules away from the area of human habitation, and combining the lactic acid solution molecules with measured amounts of carbon dioxide molecules that further simulate a human being, whereby once the mosquitoes hone in on the path of the lactic acid and lactic carbon dioxide spray that has been broadcasted into the environment, the mosquitoes will be drawn towards the source so that they can be easily destroyed by heat, electrocution and the like.

5. A mosquito control apparatus comprising a container having lactic acid solution therein, a heat element for said lactic acid solution, means for supplying electrical energy to the heating element, blower means for directing lactic acid molecules away from inhabited areas, and wherein there is simulated a human being so that mosquitoes will be attracted away from areas of human gatherings such as backyards and the like.

6. The structure as defined in claim 5 and further including a grid having said lactic acid container enclosed therein.

7. The structure as defined in claim 6 wherein the lactic acid container is housed in an enclosure and wherein the lactic acid container is arranged in an intermediate portion of the enclosure.

8. The structure as defined in claim 6 wherein the lactic acid container, electrical energy source, and the means for directing the lactic acid molecules are arranged in the lower portion of an enclosure.

* * * * *